(12) United States Patent
Bushnell

(10) Patent No.: US 7,929,941 B2
(45) Date of Patent: Apr. 19, 2011

(54) SYSTEM FOR PROVIDING EMERGENCY VOICE MAIL SERVICE

(75) Inventor: William Jackson Bushnell, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1114 days.

(21) Appl. No.: 11/303,308

(22) Filed: Dec. 16, 2005

(65) Prior Publication Data

US 2007/0142027 A1  Jun. 21, 2007

(51) Int. Cl.
*H04M 11/04* (2006.01)

(52) U.S. Cl. .................. 455/404.1; 455/413; 379/88.18; 379/88.25

(58) Field of Classification Search ....... 455/404.1–413; 379/67.1–88.28, 37–51; 370/352–383
See application file for complete search history.

(56) References Cited

U.S. PATENT DOCUMENTS

| | | | | |
|---|---|---|---|---|
| 4,086,446 A * | 4/1978 | Taylor | ......................... | 379/32.02 |
| 5,349,636 A * | 9/1994 | Irribarren | ................... | 379/88.15 |
| 5,475,737 A * | 12/1995 | Garner et al. | .............. | 379/88.26 |
| 5,535,269 A * | 7/1996 | Hamada | ......................... | 379/233 |
| 5,867,569 A * | 2/1999 | Martinez et al. | ......... | 379/114.27 |
| 6,400,690 B1 * | 6/2002 | Liu et al. | ........................ | 370/252 |
| 6,771,761 B1 * | 8/2004 | LaPierre | .................. | 379/211.02 |
| 6,850,605 B2 * | 2/2005 | Tiliks et al. | ............... | 379/114.05 |
| 6,870,910 B1 * | 3/2005 | Armstrong et al. | ......... | 379/88.22 |
| 6,928,149 B1 * | 8/2005 | Panjwani et al. | .......... | 379/88.25 |
| 6,970,546 B2 * | 11/2005 | Kent et al. | ................ | 379/207.02 |
| 7,035,935 B1 * | 4/2006 | Voois et al. | .................... | 709/238 |
| 7,158,509 B2 * | 1/2007 | Beyda | ........................... | 370/352 |
| 7,532,710 B2 * | 5/2009 | Caputo et al. | .............. | 379/88.18 |
| 7,542,428 B1 * | 6/2009 | Johnson et al. | ............... | 370/241 |
| 2005/0026646 A1 * | 2/2005 | Naim et al. | ................ | 455/552.1 |
| 2005/0111635 A1 * | 5/2005 | Caputo et al. | ............. | 379/88.22 |
| 2008/0008299 A1 * | 1/2008 | Didcock et al. | ............ | 379/88.16 |

* cited by examiner

*Primary Examiner* — Simon Sing
*Assistant Examiner* — Assad Mohammed
(74) *Attorney, Agent, or Firm* — Patton Boggs LLP

(57) ABSTRACT

The system for providing emergency voice mail service includes two components: a first component that informs a calling party that emergency voice mail service has been activated due to an interruption in telephone service provided by the affected local exchange(s), and a second component that provides emergency voice mail service to customers who are displaced from their residences or simply affected by the service outage. The calling party that wishes to leave a message or the customer whose service is interrupted and wishes to listen to their messages calls a nationwide toll free number and is routed to the Emergency Voice Mail System. The caller is asked to enter the telephone number of the customer who is out of service and then can enter a predetermined code to leave a voice mail message or retrieve a voice mail message for the wire-line or wireless customer who is out of service.

18 Claims, 2 Drawing Sheets

SYSTEM FOR PROVIDING EMERGENCY VOICE MAIL SERVICE

FIELD OF THE INVENTION

This invention relates to voice mail systems and, in particular, to a nationwide Emergency Voice Mail System for serving customers whose telephone service has been interrupted by a service outage in their home service area

BACKGROUND OF THE INVENTION

It is a problem that when natural disasters or terrorist attacks occur, wire-line and wireless telephone service can be interrupted by a service outage for extended periods of time. This is especially true when the wire-line central offices and/or their associated outside plant facilities or the wireless Mobile Switching Centers are damaged. In the case where people must evacuate their homes and live in emergency shelters for extended periods of time, it is difficult for these individuals to contact their family members or for family members to contact the displaced people due to the lack of local or mobile telephone service. Similarly, community service personnel (fire, policy, medical, etc.) must also evacuate their homes and it is difficult for their employers to contact them.

Present voice mail services can assign temporary voice mail boxes to the affected individuals, but these voice mail services require that the displaced person be assigned a new telephone number. this process requires that the displaced person's family members or emergency agencies be informed of the new telephone number, which may be impossible or difficult at best given the service outage circumstances.

Therefore, there is presently a lack of an effective response to telephone service outages and the associated displacement of customers served by the telephone systems that are impacted by the service outage.

BRIEF SUMMARY OF THE INVENTION

The present system for providing emergency voice mail service includes two components: a first that informs a calling party that emergency voice mail service has been activated due to an interruption in telephone service provided by the affected local exchange(s), and a second that provides emergency voice mail service to customers who are displaced from their residences or simply affected by the service outage.

When a calling party dials the telephone number of a telephone customer served by the affected local exchange(s), the calling party receives a recorded announcement that identifies the service outage and provides instructions for the calling party to access the Emergency Voice Mail System. The calling party who wishes to leave a message or the customer whose service is interrupted and wishes to listen to their messages calls a well-publicized nationwide toll free number, such as 1-800-MailBox, or has their call rerouted upon selection of an option while connected to the recorded announcement. The incoming call is routed to the Emergency Voice Mail System and the caller is asked to enter the telephone number of the wire-line or wireless customer who is out of service. The caller is asked to enter a predetermined code (such as "1") to leave a voice mail message for the wire-line or wireless customer who is out of service or a predetermined code (such as "2") to retrieve a voice mail message for the wire-line or wireless customer who is out of service.

In the case where telephone service is restored to the affected area but the displaced person is not residing in their home, the incoming calls to the displaced person's telephone number can continue to be redirected to the Emergency Voice Mail System where the above-noted service is provided. Similarly, when telephone service is restored, an announcement can be provided by the Emergency Voice Mail System to that effect. Thus, the entire population of telephone customers served by the local exchanges suffering the service outage can be switched to the Emergency Voice Mail System, while their return to regular telephone service can be accomplished on an individual basis so that continuity of communication can be maintained for these telephone customers.

DETAILED DESCRIPTION OF THE INVENTION

Telephone Network Service Outage

When a natural disaster or terrorist attack has damaged wire-line and/or wireless switching centers and/or major portions of the outside plant, incoming telephone calls to customers cannot be completed and telephone customers cannot originate outgoing calls from their telephones. In the case where people must evacuate their homes and live in emergency shelters for extended periods of time, it is difficult for these individuals to contact their family members or for family members to contact the displaced people due to the lack of local or mobile telephone service.

Figure 1:
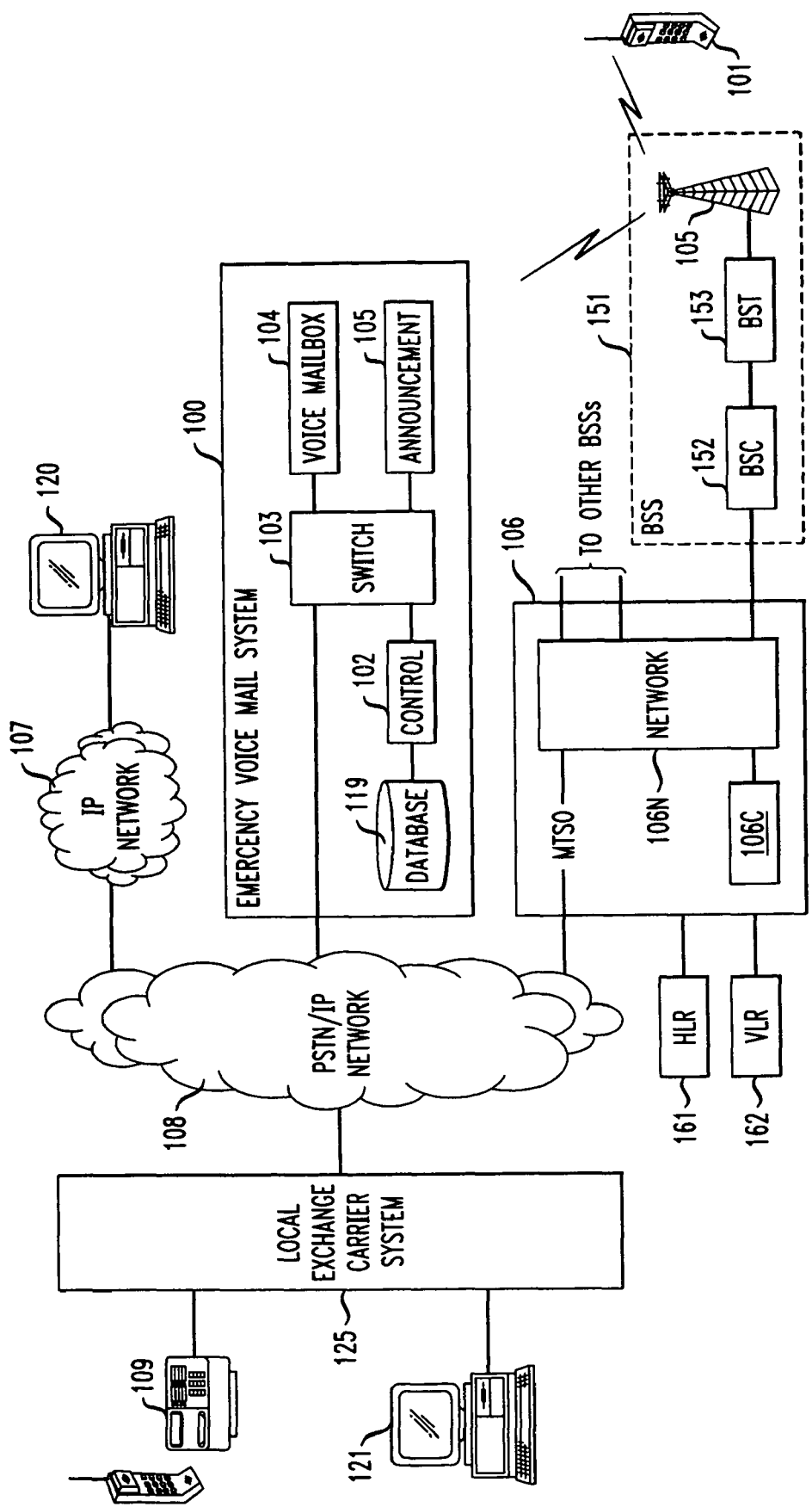
FIG. 1 illustrates the architecture of the telephone communication network and the presence of the present Emergency Voice Mail System.

FIG. 1 illustrates the architecture of a typical telephone communication network and the presence of the present Emergency Voice Mail System. In the present description, the major entities of the cellular communication network providing wireless telephone services to the wireless subscriber device 101 are the Base Station Subsystem 151 that is associated with the Mobile Telephone Switching Office 106. In a typical cellular communications network, there are numerous Mobile Telephone Switching Offices 106 and numerous Base Station Subsystems 151, but for the sake of simplicity only a single Mobile Telephone Switching Office and a single Base Station Subsystem are shown.

The typical implementation of an existing Mobile Telephone Switching Office 106 comprises a Mobile Telephone Switching Office Controller 106C, which executes call processing associated with the Mobile Telephone Switching Office 106. A switching network 106N provides the telephone connectivity between Base Station Subsystem 151. Base Station Subsystem 151 communicates with wireless subscriber device 101 using Radio Frequency (RF) channels which convey both command messages as well as digital data, which may represent voice signals being articulated at the wireless subscriber device 101 and the far-end party. With a CDMA system, the wireless subscriber device 101 communicates with at least one Base Station Subsystem 151.

The voice communications between wireless subscriber device 101 and other subscriber stations, such as land-line based subscriber station 109, is effected by routing the communications received from the wireless subscriber device 101 via switching network 106N and trunks to the Public Switched Telephone Network (PSTN) 108 where the communications are routed to a Local Exchange Carrier 125 that serves land-line based subscriber station 109. There are numerous Mobile Telephone Switching Offices 106 that are connected to the Public Switched Telephone Network (PSTN) 108 to thereby enable subscribers at both land-line based subscriber stations and wireless subscriber devices to communicate between selected stations thereof. This architecture represents the present architecture of the wireless and wire-line communication networks. The present Emergency Voice Mail System 100 is shown connected to the Public Switched Telephone Network 108, the Mobile Telephone Switching Offices 106, as well as a data communication network such as the Internet 107.

Emergency Voice Mail Service Activation

Figure 2:
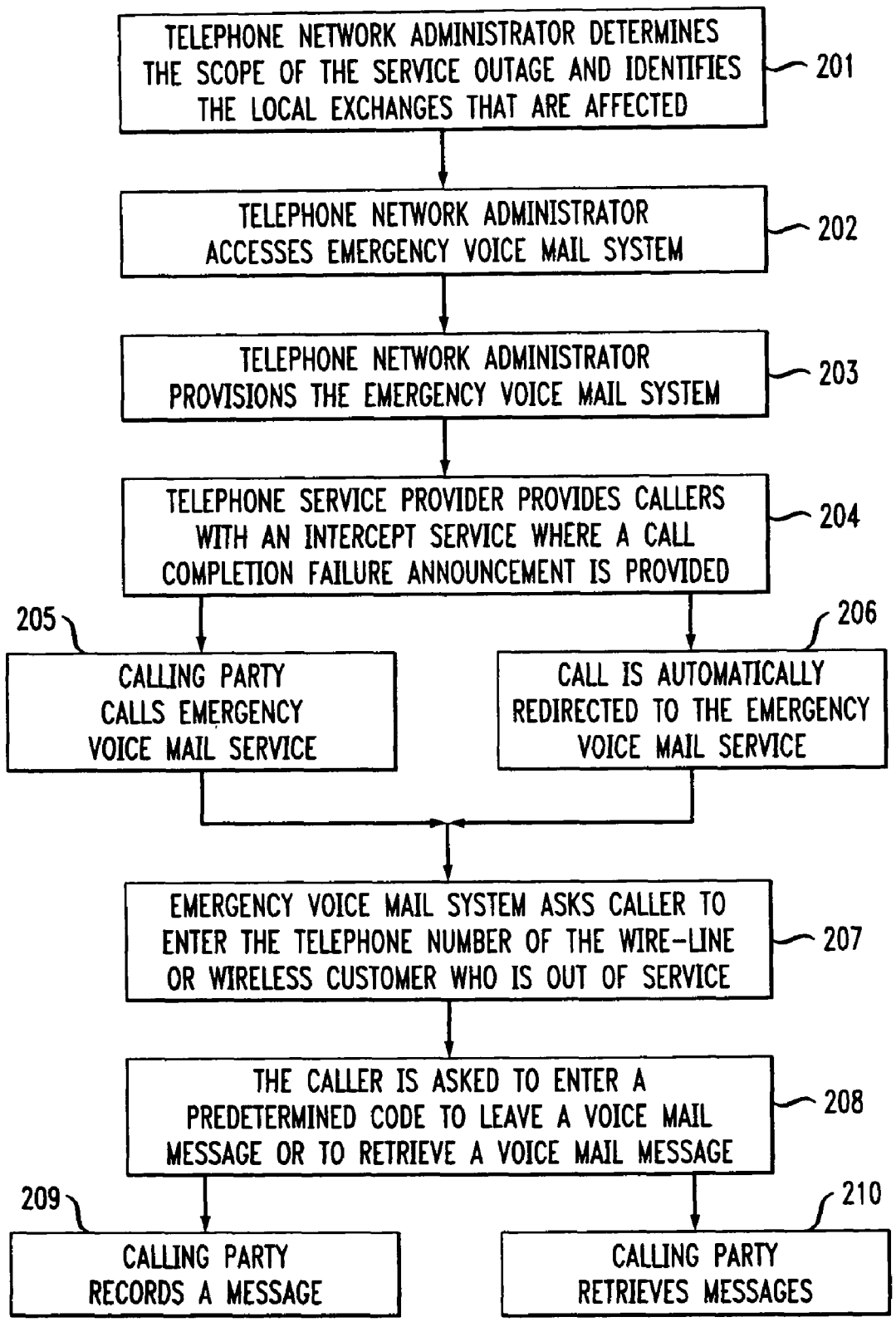
FIG. 2 illustrates, in flow diagram form, the operation of the present Emergency Voice Mail System.

FIG. 2 illustrates, in flow diagram form, the operation of the present Emergency Voice Mail System. The Emergency Voice Mail Service consists of two components: a first component that informs a calling party that the emergency voice mail service has been activated, and a second component that provides the emergency voice mail service.

The Emergency Voice Mail Service operates as follows. When there is a service outage that affects one or more local exchanges (such as local exchange carrier system 125) by damaging outside plant facilities associated with the local exchange or the local exchange (wire-line or wireless office) equipment itself is inoperable, the telephone network administrator 120 at step 201 determines the scope of the service outage and identifies the local exchanges that are affected. The network administrator 120 accesses the Emergency Voice Mail System 100 at step 202 via a secure password-protected interface in control subsystem 102 and provisions the Emergency Voice Mail System 100 at step 203 to provide emergency voice mail service to the telephone customers served by the identified local exchanges 125. The provisioning step is implemented by identifying the dial code of the identified local exchanges and also transmitting telephone customer specific data to the Emergency Voice Mail System database 119 (or providing on-line access to such information) to thereby enable the Emergency Voice Mail System 100 to provide the affected telephone customers with password-protected access to their voice mail box 104 on the Emergency Voice Mail System 100. The customer specific data can be proprietary information, such as the social security number of each of the telephone customers, to thereby prevent unauthorized parties from accessing the telephone customer's voice mail box.

In many cases, the telephone service provider is aware of the problems and provides callers at step 204 with an intercept service where a call completion failure announcement is provided, such as "We are sorry, but your call cannot be completed due to hurricane damage to the telephone system." The announcements are applied to all incoming calls that are directed to customers in the affected area—either on a local exchange or area code basis. Typically, the recorded announcement is provided by an exchange in the area that has not been affected by the service outage.

With the Emergency Voice Mail Service, the service provider can alter the messages to inform the caller that the call cannot be completed and that an Emergency Voice Mail Service has been activated. The announcement can be altered to say "We are sorry, but your call cannot be completed due to the hurricane damage to the telephone system. If you would like to leave a message for the person you are calling, please hang up and dial 1-800-MailBox." Alternatively, the calling party can be provided with the option of having their call automatically redirected to the Emergency Voice Mail Service. The associated message typically would say. "We are sorry, but your call cannot be completed due to the hurricane damage to the telephone system. If you would like to leave a message for the person you are calling, please press 1." If the local exchange server is operational, the call forwarding capability of that system can be used to redirect incoming calls to the Emergency Voice Mail System 100.

The calling party that wishes to leave a message or the customer whose service is interrupted and wishes to listen to their messages calls a well-publicized nationwide toll free number, such as 1-800-MailBox at step 205. Alternatively, the calling party can be provided with the option of having their call automatically redirected to the Emergency Voice Mail System 100. The associated message typically would say. "We are sorry, but your call cannot be completed due to the hurricane damage to the telephone system. If you would like to leave a message for the person you are calling, please press 1." The incoming call is routed to the Emergency Voice Mail System 100 at step 206. The caller, when connected to the Emergency Voice Mail System 100 at step 207, is connected via switch 103 to an interactive voice message system 105 and is asked to enter the telephone number of the wire-line or wireless customer who is out of service. The caller is then asked at step 208 to enter a predetermined code (such as "1") to leave a voice mail message for the wire-line or wireless customer who is out of service or a predetermined code (such as "2") to retrieve a voice mail message for the wire-line or wireless customer who is out of service. The calling party then records a message in voice mail box 104 at step 209 or retrieves messages from voice mail box 104 at step 210. If the calling party retrieves messages, they must traverse a password system to ensure the identity of the calling party as the wire-line or wireless customer whose telephone is out of service and who is assigned to this voice mail box. The accessing telephone customer has the ability to save or delete the messages that are retrieved from the Emergency Voice Mail System 100.

Additional features may include the ability for the owner of the voice mail box to leave a greeting or a personal announcement, such as an identification of an alternate destination telephone number, for any calling party who accesses the telephone customer's voice mail box, and the calling party can either leave a message or be prevented from leaving a message since service is restored. In the case where telephone service is restored to the affected area but the displaced person is not residing in their home, the incoming calls to the displaced person's telephone number can be redirected to the Emergency Voice Mail System 100 where the above-noted service is provided Similarly, when telephone service is restored, an announcement can be provided by the Emergency Voice Mail System 100 to that effect.

SUMMARY

The system for providing emergency voice mail service includes two components: a first component that informs a calling party that emergency voice mail service has been activated due to an interruption in telephone service provided by the affected local exchange(s), and a second component that provides emergency voice mail service to customers who are displaced from their residences or simply affected by the service outage.

What is claimed as new and desired to be protected by Letters Patent of the United States is:

1. An Emergency Voice Mail System connected to the telephone network for providing emergency voice mail service to a plurality of telephone customers whose serving local exchange is suffering a service outage, comprising:
   emergency customer mail box for storing voice messages for a plurality of telephone customers:

emergency voice mail controller, resident in the telephone network and responsive to a local exchange suffering a service outage, for activating emergency voice mail service, comprising:

service outage database for identifying a plurality of telephone customers served by said local exchange which is suffering a service outage, announcement system, responsive to a calling party dialing a telephone number of one of said identified telephone customers, for providing said calling party with a recorded announcement identifying the existence of said service outage, call redirection system for enabling said calling party to manually select one of: automatic redirection of their call to said emergency customer mail box and manually dialing a telephone number of said emergency customer mail box; and wherein said emergency customer mail box comprises:

mail box interface, responsive to said calling party accessing said emergency customer mail box and redialing the telephone number of said identified telephone customer, for enabling said calling party to record a message for said identified telephone customer.

2. The system for providing emergency voice mail service of claim 1 wherein said emergency voice mail controller comprises:

administrator interface for enabling a telephone network administrator to access said system for providing emergency voice mail service on a secure basis; and coverage map for enabling said network administrator to define said plurality of telephone customers by identifying said serving local exchange that is suffering a service outage.

3. The system for providing emergency voice mail service of claim 1 further comprising:

incoming call rerouter for rerouting an incoming call, received from a calling party and directed to said telephone customer, to a recorded announcement system for providing said calling party with instructions for accessing said Emergency Voice Mail System.

4. The system for providing emergency voice mail service of claim 3 further comprising:

access controller, responsive to said calling party dialing a predetermined code when connected to said recorded announcement system, for redirecting said calling party from said recorded announcement system to said emergency customer mail box.

5. The system for providing emergency voice mail service of claim 3 further comprising:

Emergency Voice Mail System access for delivering data indicative of a listed directory number of said Emergency Voice Mail System from said recorded announcement system to said calling party.

6. The system for providing emergency voice mail service of claim 1 wherein said mail box interface comprises:

password access for providing password protection of said customer voice mail box for said telephone customer.

7. The system for providing emergency voice mail service of claim 6 wherein said mail box interface further comprises:

personalized announcement for providing a calling party with a recorded announcement from said telephone customer.

8. The system for providing emergency voice mail service of claim 1 further comprising:

service restoration, responsive to said serving local exchange being restored to service from said service outage, for enabling each of said plurality of telephone customers to individually deactivate said emergency voice mail service for their emergency customer voice mail box.

9. The system for providing emergency voice mail service of claim 1 further comprising:

service restoration, responsive to said serving local exchange being restored to service from said service outage, for automatically deactivating said emergency voice mail service for said plurality of telephone customers.

10. A method of operating an Emergency Voice Mail System that is connected to the telephone network for providing emergency voice mail service to a plurality of telephone customers whose serving local exchange is suffering a service outage, comprising:

storing voice messages for a plurality of telephone customers in an emergency voice mail box.

activating an emergency voice mail controller, resident in the telephone network and responsive to a local exchange suffering a service outage, to initiate emergency voice mail service, comprising:

identifying, in a service outage database, a plurality of telephone customers served by said local exchange which is suffering a service outage, providing, in response to a calling party dialing a telephone number of one of said identified telephone customers, said calling party with a recorded announcement identifying the existence of said service outage, enabling said calling party to manually select one of: automatic redirection of their call to said emergency customer mail box and manually dialing a telephone number of said emergency customer mail box; and wherein said step of storing voice messages in an emergency customer mail box comprises:

enabling, in response to said calling party accessing said emergency customer mail box and redialing the telephone number of said identified telephone customer, said calling party to record a message for said identified telephone customer.

11. The method of providing emergency voice mail service of claim 10 wherein said step of activating comprises:

enabling a telephone network administrator to access said system for providing emergency voice mail service on a secure basis; and enabling said network administrator to define said plurality of telephone customers by identifying said serving local exchange that is suffering a service outage.

12. The method of providing emergency voice mail service of claim 10 further comprising:

rerouting an incoming call, received from a calling party and directed to said telephone customer, to a recorded announcement system for providing said calling party with instructions for accessing said Emergency Voice Mail System.

13. The method of providing emergency voice mail service of claim 12 further comprising:

redirecting, in response to said calling party dialing a predetermined code when connected to said recorded announcement system, said calling party from said recorded announcement system to said emergency customer voice mail box.

14. The method of providing emergency voice mail service of claim 12 further comprising:

delivering data indicative of a listed directory number of said Emergency Voice Mail System from said recorded announcement system to said calling party.

15. The method of providing emergency voice mail service of claim 10 wherein said step of providing comprises:

providing password protection of said customer voice mail box for said telephone customer.

16. The method of providing emergency voice mail service of claim 15 wherein said providing further comprises:

providing a calling party with a recorded announcement from said telephone customer.

17. The method of providing emergency voice mail service of claim 10 further comprising:

enabling, in response to said serving local exchange being restored to service from said service outage, each of said plurality of telephone customers to individually deactivate said emergency voice mail service for their emergency customer voice mail box.

18. The method of providing emergency voice mail service of claim 10 further comprising:

automatically deactivating, in response to said serving local exchange being restored to service from said service outage, said emergency voice mail service for said plurality of telephone customers.

* * * * *